Sept. 10, 1968     H. FUNFSTUCK     3,400,709
ARTERIAL BLOOD PRESSURE MONITOR
Filed Oct. 1, 1965
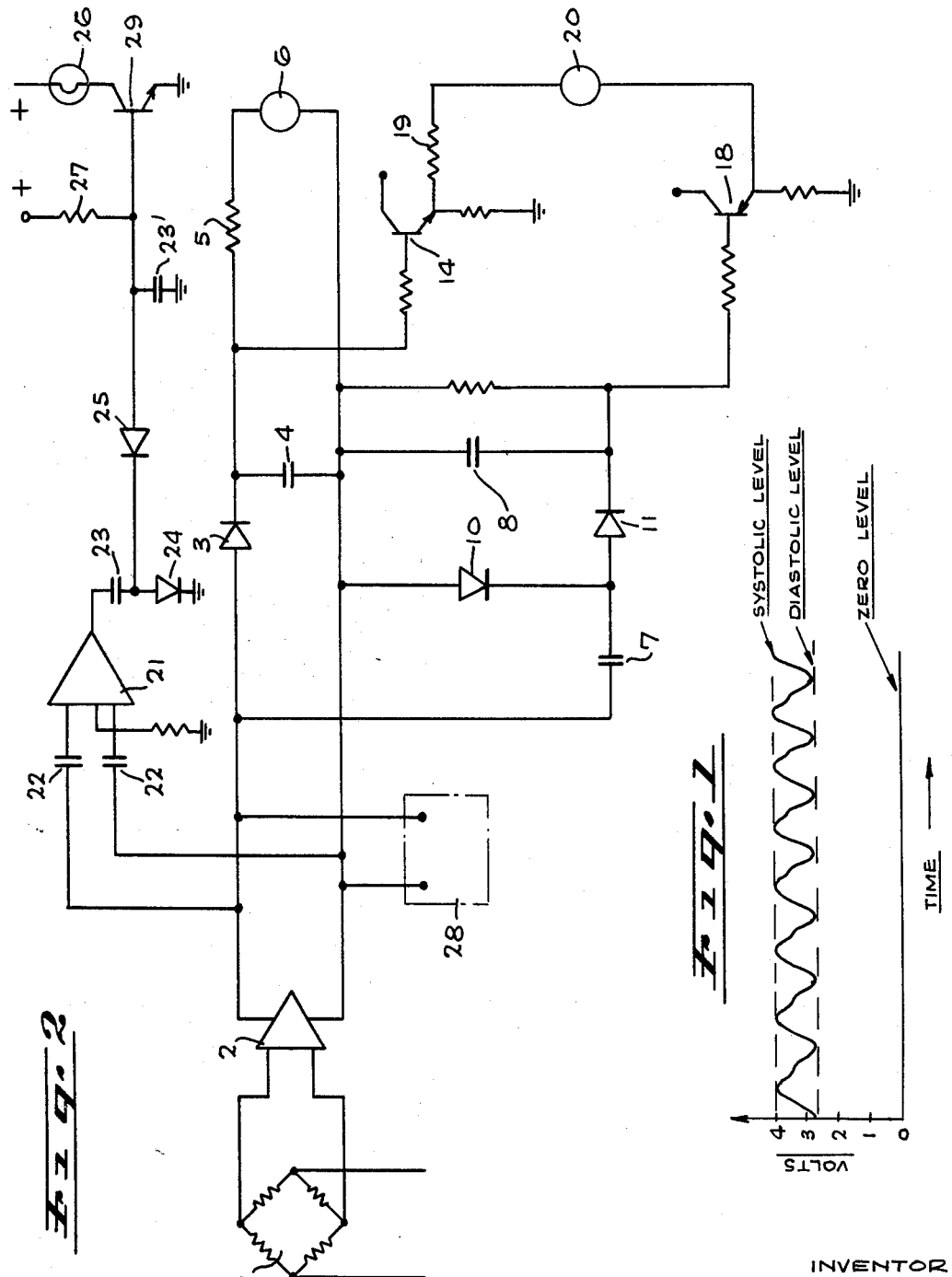
INVENTOR
*HORST FUNFSTUCK*
BY
ATTORNEY 3,400,709
ARTERIAL BLOOD PRESSURE MONITOR
Horst Fünfstück, Los Angeles, Calif., assignor to Statham Instruments, Inc., Los Angeles, Calif., a corporation of California
Filed Oct. 1, 1965, Ser. No. 492,045
8 Claims. (Cl. 128—2.05)

ABSTRACT OF THE DISCLOSURE

A strain-gage transducing device provides an alternating signal representative of a heart beat—the positive peak indicating the systolic level and the negative peak, the diastolic level. The alternating signal is fed into a differential amplifier, one output of which is rectified and stored in a capacitor to provide a signal indicative of the systolic level. The entire output of the differential amplifier is rectified and stored in a second capacitor providing a signal indicative of the peak-to-peak amplifier output. A subtracting circuit relates the stored positive signal and the stored peak-to-peak signal to provide a further signal representative of the negative swing of the AC signal or the diastolic level. An additional aspect is the provision of a pulse failure indicator which includes a second differential amplifier fed by the output of the first differential amplifier to reverse bias a transistor in series with an indicator lamp maintaining the lamp in the "off" condition as long as there is an output from the first differential amplifier. When the heart pulse fails the reverse bias is removed from the transistor and the indicator light goes "on."

---

This invention relates to blood pressure indicating and recording devices.

It is an object of my invention to separately indicate or record the systolic and diastolic blood pressure.

It is a further object of my invention to provide means whereby the pulse rate may be indicated or recorded.

It is a further object of my invention to provide means to warn when the pulse rate reaches a predetermined lower limit.

In its generic aspect, my invention utilizes an electric signal output of a blood pressure transducer whose signal intensity and variation in intensity follows the blood pressure. The signal is thus an AC signal with a wave shape which follows the blood pressure wave. The AC signal consists of a DC signal responsive to the static blood pressure on which is superimposed an AC signal. The peak value of the AC signal is responsive to the systolic pressure and the diastolic pressure is the value of the negative peak of the AC wave. The signal is separated into two DC signals, one responsive to the systolic pressure and the other to the diastolic pressure.

In my preferred embodiment, the AC signal is passed through a peak voltage rectifier to a read-out device circuit indicating the peak value of the signal responsive to the systolic pressure. The peak-to-peak (positive to negative peak) signal is obtained by a peak-to-peak rectifier. I also provide a subtractive circuit which subtracts the peak-to-peak signal from the peak signal value which is responsive to the systolic pressure. The difference of these signals is responsive to the diastolic pressure and may be separately indicated or recorded.

I may also provide in my preferred embodiment a pulse failure signal to be more fully described below, although this is an added feature which may or may not be used without impairing the function described.

The invention will be further described by reference to the drawings in which:

FIG. 1 is a schematic illustration of the blood pressure wave; and

FIG. 2 is a schematic circuit diagram of the monitor of my invention.

The system of my invention employs a cardiovascular pressure transducer, either of the intra-arterial type, or an extra arterial transducer, such as sphygmomanometer or any other pressure gauge which is responsive to the blood pressure and produces an electric signal.

It is now common practice to use strain gauge pressure transducers employing filaments whose resistance changes with strain and which employ bridge read-outs such as the bridge illustrated in FIG. 2 as 1. Instead of a Wheatstone bridge read-out of a strain gauge, I may employ gauges using potentiometer read-outs, inductive type or capacitance type read-outs to give an electrical signal responsive to both the static and wave form of the blood pressure.

The signal output may be schematically illustrated as in FIG. 1. The curve of the blood pressure wave consists of a high static pressure DC signal modified by an AC signal. In normal blood pressure, the peak to peak value of the signal is about 30% of the amplitude of the maximum potential above zero.

Referring now to FIG. 2, the bridge 1 is excited by a usual excitation source with the output taken across the other diagonals of the bridge and fed into the differential amplifier 2. The output of the amplifier passes through a rectifier 3 to a storage capacitor 4 across which is shunted a resistor 5 and a microammeter 6 forming a volt meter. By making the capacitor 4 large enough to maintain the peak potential between periods of the wave, the volt meter will indicate the positive peak value of the wave, which is the systolic level of the composite signal. The capacitor 7 connected to the amplifier 2 will charge to the negative peak to zero voltage of the AC-DC composite signal. Capacitor 7 is made large enough to maintain the peak voltage during the entire period of the wave. When the AC signal passes through the imaginary zero line in a positive direction, the voltage stored in capacitor 7 is in series with the AC signal. Depending upon the discharge time constant of the circuit, this negative peak to zero voltage becomes series connected with the positive peak to zero voltage. Diode 11 will be conductive and charge capacitor 8 to the peak to peak voltage of the AC signal. The voltage across capacitor 8 is subtracted from the voltage across capacitor 4 and amplified by the transistors 14 and 18 and the net voltage is the voltage which is responsive only to the diastolic pressure.

Resistor 19 and microammeter 20 are connected in series between the emitters of transistors 14 and 18. Resistor 19 and microammeter 20 form a volt meter, which will indicate the difference between the peak value and the peak to peak value, which is thus the diastolic level of the composite signal.

Both volt meters 6 and 20 have scales calibrated in the desired pressure ranges to facilitate direct reading of systolic and diastolic pressures.

The pulse failure indicator is connected as follows: the differential amplifier 21 is capacitively coupled through the capacitors 22 to the output of the differential amplifier 2. The output of amplifier 21 is peak to peak rectified by the capacitors 23 and 23' and rectifying diodes 24 and 25. The capacitor 23' is also connected to ground. The negative DC signal at 23' is fed to the base of a gating transistor 29 whose emitter is connected to ground and whose collector is connected in series with some indicating device, such as a lamp 26 or other signal indicating means to the plus power source.

While the heart pulse persists, a DC potential is applied to the base of 29 and maintains the transistor in the reverse biased condition and no current flows from emitter to collector and thus the lamp 26 does not glow. If the signal derived from 2 falls below that required to bias the transistors to the nonconductive condition or fails completely due to the cessation of heart beat, the transistor becomes conductive due to the positive base current through resistor 27 and the collector current will cause the lamp 26 to light.

Provision is also made to connect any other instruments whose read-out is a function of the heart beat by means of a connection 28 at the output of the amplifier 2. For example, I may apply a cardiotachometer. Such devices are well known in the prior art. The instrument produces a DC output which is linearly proportional to the integrated rate of the heart pulse. The output of 2 may also be connected to a recorder to record the wave form of the heart beat. No claim is made for such cardiotachometer or recorder except as components of the circuits of my invention.

As indicated above, the pulse failure circuit may or may not be used. However, together with the reporting of the systolic and diastolic pressure, it is a valuable aid in monitoring the heart and permits instantaneous recognition of any heart failure. It may, however, be used separately from the determination of the systolic and diastolic pressure measurements.

While I have described a particular embodiment of my invention for the purpose of illustration, it should be understood that various modifications and adaptations thereof may be made within the spirit of the invention, as set forth in the appended claims.

I claim:

1. A blood pressure registering circuit comprising: first circuit means to receive an input signal having an AC component superimposed upon a DC component and representative of a blood pressure wave and to develop an amplified signal corresponding to said input signal; second circuit means to rectify the positive peak output of said first circuit means for producing a first output signal which is proportional to the systolic pressure of the blood pressure wave; third circuit means to rectify only the AC component of said input signal and to produce a second output signal proportional thereto; and fourth circuit means for subtracting said first and second output signals to produce a difference output signal proportional to the diastolic pressure of the blood pressure wave.

2. The invention as defined in claim 1, wherein said second circuit means includes means for indicating the amplitude of said first output signal, and wherein said fourth circuit means includes means for indicating the amplitude of said difference output signal.

3. A blood pressure registering unit comprising: first circuit means to receive an input signal having an AC component superimposed upon a DC component and representative of a blood pressure wave and to develop an amplified signal corresponding to said input signal; second circuit means to rectify the positive peak output of said first circuit means for producing a first output signal which is proportional to the systolic pressure of the blood pressure wave; third circuit means to rectify only the AC component of said input signal and to produce a second output signal proportional thereto; fourth circuit means for subtracting said first and second output signals to produce a difference output signal proportional to the diastolic pressure of the blood pressure wave; a differential amplifier connected to receive said input signal; a device connected to the output of said amplifier to develop a pulse when one appears at the input to said amplifier; and an indicator actuable in response to the absence of a pulse of predetermined amplitude at the output of said device.

4. A blood pressure registering circuit comprising: a bridge type transducer; a differential amplifier connected from the output leads of said transducer, said amplifier having two output leads; a first diode, a volt meter connected serially from one of the output leads to the other output lead; a first capacitor connected in parallel with said volt meter; a second capacitor connected from said one lead in series through a second diode and a second capacitor to the other of said leads; a third diode connected to the junction of said second capacitor and said second diode; a third capacitor connected in series with the third capacitor to the other output lead between said first mentioned capacitor and said volt meter and a resistor connected in parallel with said last mentioned third capacitor; and two emitter-follower transistors, the emitters of said transistors connected to a volt meter, said second and fourth resistors connected to said output leads and to the bases of said transistors.

5. A blood pressure registering circuit comprising: means for producing a varying direct current signal proportional to blood pressure; means including a rectifier for producing a first signal proportional to the peak amplitude of said varying signal; means including a rectifier for producing a second signal proportional to the amplitude of only the alternating component of said varying signal; and means to combine said first and second signals in polarity opposition to determine the difference in amplitude therebetween.

6. A blood pressure registering circuit comprising: first circuit means to receive an input signal having an AC component superimposed upon a DC component and representative of a blood pressure wave and to develop an amplified signal corresponding to said input signal; second circuit means to rectify the positive peak output of said first circuit means for producing a first output signal which is proportional to the systolic pressure of the blood pressure wave; third circuit means to rectify only the AC component of said input signal and to produce a second output signal proportional thereto; fourth circuit means for subtracting said first and second output signals to produce a difference output signal proportional to the diastolic pressure of the blood pressure wave; and means coupled to the output of said amplifier to indicate the presence of said amplified signal, said means including the peak to peak rectifier connected to said output and a signal indicator connected to said last named rectifier.

7. A blood pressure registering unit comprising: first circuit means to receive an input signal having an AC component superimposed upon a DC component and representative of a blood pressure wave and to develop an amplified signal corresponding to said input signal; second circuit means to rectify the positive peak output of said first circuit means for producing a first output signal which is proportional to the systolic pressure of the blood pressure wave; third circuit means to rectify only the AC component of said input signal and to produce a second output signal proportional thereto; fourth circuit means for subtracting said first and second output signals to produce a difference output signal proportional to the diastolic pressure of the blood pressure wave; a differential amplifier connected to reecive said input signal; a device connected to the output of said amplifier to develop a pulse when one appears at the input to said amplifier; an indicator actuable in response to the absence of a pulse of predetermined amplitude at the output of said device; and means coupled to the output of said amplifier to indicate the presence of said amplified signal, said means including the peak to peak rectifier connected to said output and a signal indicator connected to said last named rectifier.

8. A blood pressure registering circuit comprising: a bridge type transducer; a differential amplifier connected from the output leads of said transducer, said amplifier having two output leads; a first diode, a volt meter connected serially from one of the output leads to the other output lead; a first capacitor connected in parallel with said volt meter; a second capacitor connected from said one lead in series through a second diode and a second capacitor to the other of said leads; a third diode connecte to the junction of said second capacitor and said second diode; a third capacitor connected in series with the third capacitor to the other output lead between said first mentioned capacitor and said volt meter and a resistor connected in parallel with said last mentioned third capacitor; a second amplifier capacitively coupled to said output leads; a peak to peak rectifier coupled to the output of said second amplifier; a gating transistor; the base of said gating transistor connected to said peak to peak rectifier; and a signal indicator connected in series with the collector of said gating transistor.

References Cited

UNITED STATES PATENTS

| | | | |
|---|---|---|---|
| 1,788,434 | 1/1931 | Keeler | 128—2.05 |
| 2,756,741 | 7/1956 | Campanella | 128—2.05 |
| 3,085,567 | 4/1963 | Vigilante | 128—2.05 |
| 3,349,763 | 10/1967 | Clements et al. | 128—2.07 |

RICHARD A. GAUDET, *Primary Examiner.*

S. BRODER, *Assistant Examiner.*